United States Patent
Gomes et al.

(10) Patent No.: US 7,293,069 B2
(45) Date of Patent: Nov. 6, 2007

(54) METHOD AND APPARATUS FOR SUPPLYING NETWORK PATH BOOKMARK INFORMATION REMOTELY TO A MOBILE DEVICE

(75) Inventors: John Isaac Chandan Gomes, Singapore (SG); Ngee Chuan Tan, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1228 days.

(21) Appl. No.: 09/922,463

(22) Filed: Aug. 2, 2001

(65) Prior Publication Data

US 2002/0120683 A1   Aug. 29, 2002

(30) Foreign Application Priority Data

Feb. 28, 2001   (SG)  ............................... 200101252

(51) Int. Cl.
  *G06F 15/16* (2006.01)
(52) U.S. Cl. ........................ 709/217; 709/203
(58) Field of Classification Search ........ 709/217–219, 709/201–203, 245, 223, 226, 244; 707/102, 707/10; 715/744, 847; 455/557, 566
See application file for complete search history.

(56) References Cited

U.S. PATENT DOCUMENTS

| 6,032,162 | A  | * | 2/2000 | Burke ..................... | 715/501.1 |
| 6,256,666 | B1 | * | 7/2001 | Singhal .................... | 709/217 |
| 6,285,889 | B1 | * | 9/2001 | Nykanen et al. ........... | 455/557 |
| 6,427,175 | B1 | * | 7/2002 | Khan et al. ................ | 709/245 |
| 6,515,988 | B1 | * | 2/2003 | Eldridge et al. ........... | 370/389 |
| 6,533,422 | B2 | * | 3/2003 | Janssen et al. ............. | 353/119 |
| 6,560,640 | B2 | * | 5/2003 | Smethers ................... | 709/219 |
| 6,748,471 | B1 | * | 6/2004 | Keeney et al. ............. | 710/220 |

(Continued)

FOREIGN PATENT DOCUMENTS

EP   0987868   3/2000

(Continued)

OTHER PUBLICATIONS

"Wireless Application Protocol Push Architectural Overview; Version 08-11-1999". Wireless Application Protocol Forum, Ltd. 1998, Nov. 8, 1999, XP002155620, p. 11, 15 and 19.

(Continued)

*Primary Examiner*—Nathan Flynn
*Assistant Examiner*—Mohammad Siddiqi (57) ABSTRACT

A method and apparatus for supplying information stored remotely to an appliance via a mobile device are provided. A client computer extracts the network path bookmark information from a predetermined directory in the client computer, and transmits the network path bookmark information to a server computer via a first communication network. The mobile device, which is connected to the server computer via a second communication network, requests the at least one network path bookmark information, and the server computer transmits the requests network path bookmark information to the mobile device. The mobile device then initiates the process by sending instructions to a computer system via a network. The instructions designate information to be processed using at least one bookmark as well as the appliance to which the information is to be applied. According to the instructions, the information is retrieved and converted to a document format suitable for the appliance. The computer system then applies the document to the designated appliance.

19 Claims, 3 Drawing Sheets

U.S. PATENT DOCUMENTS

| | | | |
|---|---|---|---|
| 6,766,363 B1* | 7/2004 | Rothschild | 709/219 |
| 6,775,291 B1* | 8/2004 | Ryu et al. | 370/401 |
| 7,092,370 B2* | 8/2006 | Jiang et al. | 370/329 |
| 2002/0058499 A1* | 5/2002 | Ortiz | 455/412 |
| 2002/0078102 A1* | 6/2002 | Dutta | 707/526 |
| 2002/0111176 A1* | 8/2002 | Roeder | 455/466 |

OTHER PUBLICATIONS

"Free Bookmark Managers", Internet Citation, 1998, XP002941075.

Flynn M et al: "The satchel system architecture:mobile access to document services", Mobile Networks And Applications,ACM, New York, NY, US, vol. 5, De. 2000, pp. 243-258, XP002960125, ISSM:1383-469X.

* cited by examiner

METHOD AND APPARATUS FOR SUPPLYING NETWORK PATH BOOKMARK INFORMATION REMOTELY TO A MOBILE DEVICE

BACKGROUND OF THE INVENTION

This invention relates to a method and an apparatus for supplying remotely stored network path bookmark information to a mobile device.

In recent years, the popularity of the internet and coupled with this, the popularity of internet web browser programs have increased immensely. Furthermore, there has been a huge growth of offered services and homepages in the internet, each being linked to a unique internet address, usually called URL.

In order to make the usage of the internet more convenient, so called favorites or bookmarks, in the following also denoted as network path bookmark information, have been implemented as a mechanism in a browser program. The network path bookmark information in this context is a unique internet address, which is stored within the internet browser program in such a way that a user may select this presented network path bookmark information without needing to type in the entire internet address of the desired homepage.

This provides an easy facility to reuse, generally remember, frequently used homepages and with this, frequently used web services.

However, it is a common problem faced by a lot of users working on multiple personal computers to port these network path bookmark information or synchronize the network path bookmark information between the computers used.

Thus, it is necessary for most of the users to carry the network path bookmark information in a portable storage. Besides, there has not been provided a mechanism to access the network path bookmark information stored on a desk top computer from a mobile device like a mobile phone or a lap top or a personal digital assistant (PDA).

SUMMARY OF THE INVENTION

Therefore, it is an object of the invention to provide a mechanism for supplying network path bookmark information which is stored in a client computer, for example a desk top computer to a mobile device.

The object is achieved by a method and apparatus for supplying network path bookmark information to a mobile device with the features according to the independent claims.

According to a first aspect of the invention, a method for supplying at least one network path bookmark information to a mobile device, the network path bookmark information being stored in a client computer, comprises the following steps:

a) the client computer determines the network path bookmark information from a predetermined directory in the client computer,
b) the client computer transmits the network path bookmark information to a server computer via a first communication network,
c) the mobile device, which is connected to the server computer via a second communication network, requests the at least one network path bookmark information, and
d) the server computer transmits the requested network path bookmark information to the mobile device.

According to a second aspect of the invention, a method for supplying remotely stored information to an appliance via a mobile device, the appliance being connected to a first computer system, comprises the following steps:

determining at least one network path bookmark information designating a remotely stored information to be processed, wherein the determination of the network path bookmark information comprises the following steps:

a) the client computer determines the network path bookmark information from a predetermined directory in the client computer,
b) the client computer transmits the network path bookmark information to a server computer via a first communication network,
c) the mobile device, which is connected to the server computer via a second communication network, requests the at least one network path bookmark information, and
d) the server computer transmits the requested network path bookmark information to the mobile device, designating the determined network path bookmark information of the remotely stored information to be processed and the appliance to which the information, which is connected to the network path bookmark information, is to be applied as instructions in the mobile device, transmitting the instructions from the mobile device to the first computer system via a first communication network, retrieving the information and converting the information to a format suitable for the appliance, and supplying the information to the appliance for processing according to the instructions.

In this context, the information may be understood as a piece of textual information being addressable, i.e. linked, using the network path bookmark information, e.g. a web-based piece of information, e.g. a web site, i.e. an internet page, which is encoded according to the HTML format or according to the WML format. In other words, the information may be considered as being the content of an internet page being addressed by a bookmark, e.g. a URL.

According to a third aspect of the invention, a computer system which allows a user of a mobile device to retrieve at least one network path bookmark information, the network path bookmark information being stored in a client computer, comprises:

a client computer having stored at least one network path bookmark information being stored in a predetermined directory in the client computer, and comprising means for determining the requested network path bookmark information from the predetermined directory, a server computer being connected to the client computer via a first communication network, the server computer being adapted to receive the extracted network path bookmark information from the client computer, the mobile device, being connected to the server computer via a second communication network and being adapted to request network path bookmark information from the server computer.

The invention provides a very simple and thus cheap way for automatically providing network path bookmark information to a mobile device.

DETAILED DESCRIPTION OF THE INVENTION

Figure 1:
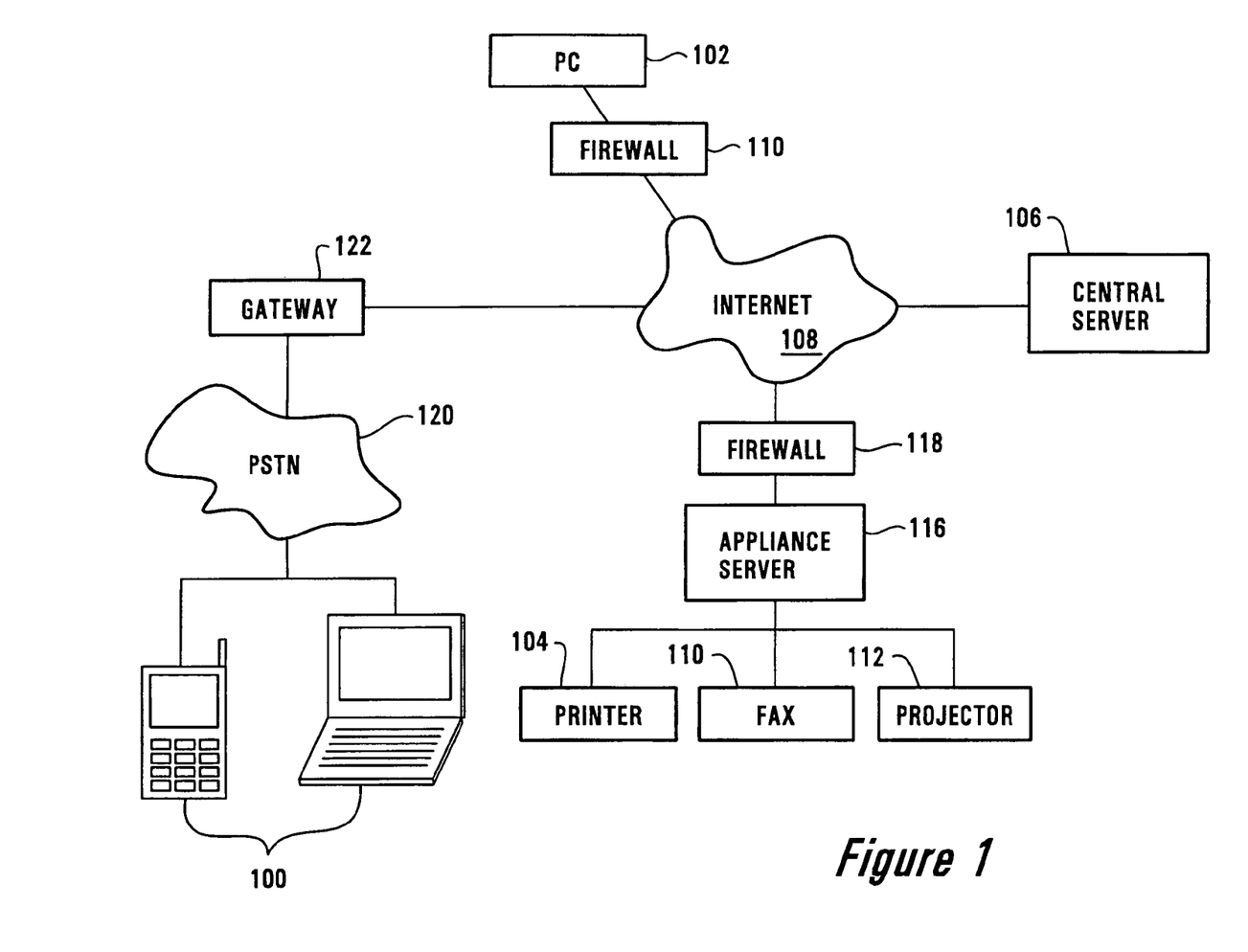
FIG. 1 illustrates one preferred embodiment of the invention.

In one preferred embodiment of the invention as shown in FIG. 1, a user of a mobile device 100 such as a mobile phone can print documents stored in his personal computer 102 or any other computer being connected to the internet 108 via a printer 104.

In other words, the user of a mobile device such as a mobile phone can print documents stored in any computer being connected to the Internet and being freely accessible by the user via the internet.

In this context, the document is a piece of textual information being addressable, i.e. linked, using the network path bookmark information, i.e. a web-based piece of information, e.g. a web site, i.e. an internet page, which is encoded according to the HTML format or according to the WML format. In other words, the document is the an internet page being addressed by a bookmark, e.g. a URL.

Generally, the user of a mobile device 100 can print documents stored in any computer connected to the internet and being accessible to the mobile device 100 using the HTTP protocol.

To enable the user to access the document remotely, the mobile device 100 first determines the unique internet address (URL) which is assigned to the document which is to be printed.

In other words, the mobile device 100, in a first step, determines the internet address of the document he wants to print. According to this preferred embodiment of the invention, the mobile device 100 determines recently used network path bookmark information, i.e. favorites or bookmarks of web based browser programs for addressing the documents to be printed.

Figure 2:
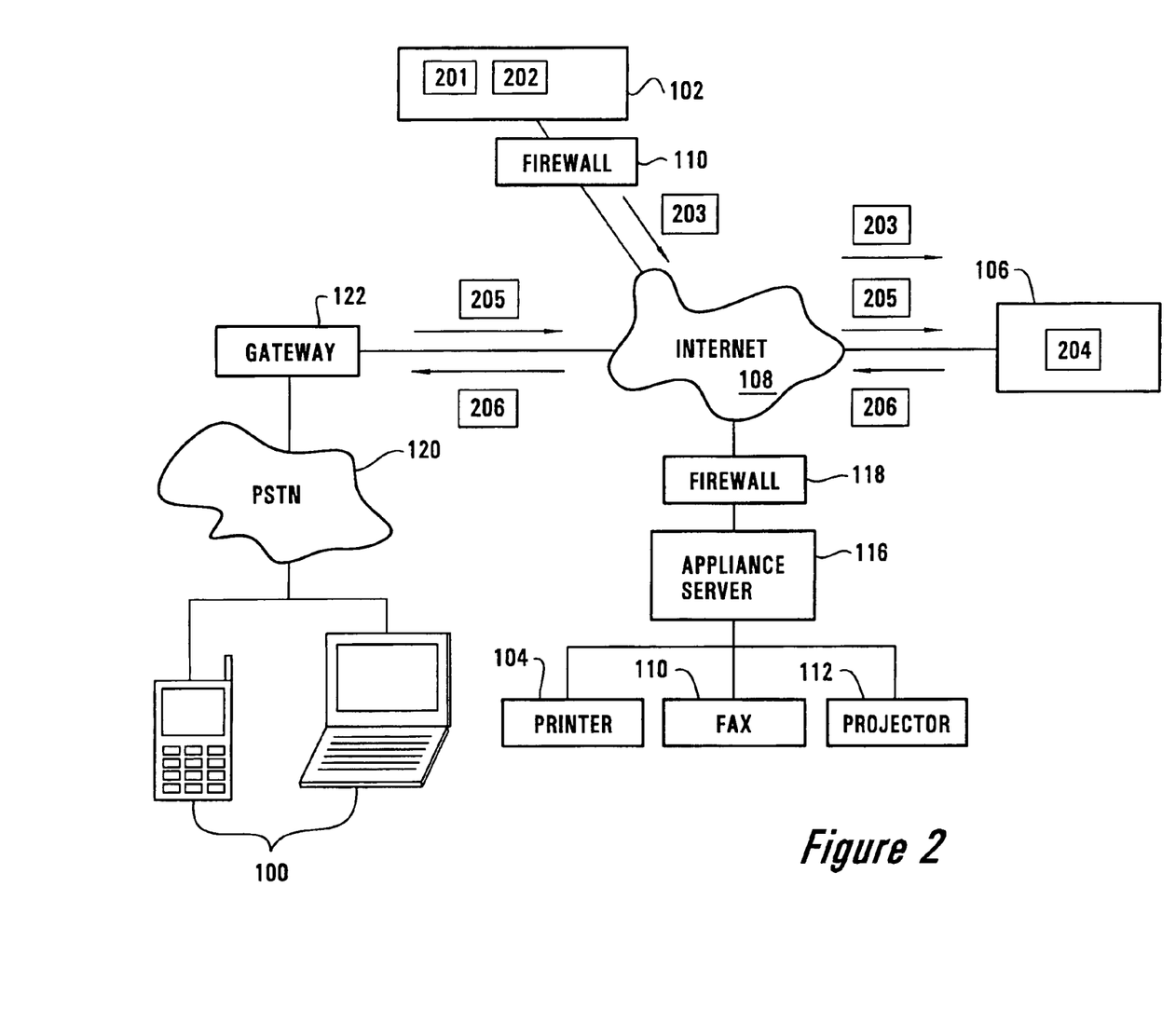
FIG. 2 illustrates the exchange of bookmarks according to the preferred embodiment of the invention.

As shown in FIG. 2, the user's personal computer 102 has installed a browser program 201 and together with the browser program 201, a list 202 of bookmarks being stored in a memory device (not shown) of the personal computer 102.

The list 202 of bookmarks comprises a plurality of URLs of internet pages offered via the internet, which have recently been selected by the user of the browser program 201 for being a favorite for the user.

According to this preferred embodiment of the invention, the personal computer 102 runs on the operating system WindowsNT™ 4.0. As a browser program 201, preferably an internet browser program (World Wide Web browser program, WWW browser program), e.g. the Netscape™ Communicator™ browser program or the Internet Explorer™, is used.

In these embodiments, usually the list of bookmarks is stored under a predefined directory, using the Internet Explorer™, the directory C:\winnt\Profiles\Name_of_User\Favorites\, for example, wherein the parameter "Name_of_User" usually denotes the name of the respective user of the browser program.

It should be noted that this directory designation is a usual default directory for storing bookmarks. However, any other directory for storing the respective bookmarks may be defined and used.

The personal computer 102 extracts the list 202 of bookmarks from the browser program repeatedly in a predefined time interval and transmits the list 202 to the central server computer 106 via the internet 108 and the first firewall 110 using a first bookmark message 203. The detailed architecture of the computer system will be described later in more detail with respect to FIG. 3.

Alternatively, the list 202 may be provided to the central server computer 106 in answer to a request message sent by the central server computer 106 to the personal computer 102.

After having received the first bookmark message 203, the central server computer 106 stores the bookmarks in a central bookmark list 204 in its memory device. Alternatively, an already existing central bookmark list 204 may be updated according to a received list 202 from one or a plurality of personal computers 102.

In other words, after having received the lists 202 of bookmarks, via the central bookmark list 204 stored, the central server computer 106 has now access to all the bookmarks which are stored on the personal computers 102 being connected to the server computer 106 and which provide the central server computer 106 with their bookmarks.

When the mobile device 100 wants to print a document, the mobile device 100 connects to the central server computer 106 and transmits a request message 205 to the central server computer 106, therewith requesting the central bookmark list 204 or at least a part of the central bookmark list 204.

In answer to the request message 205, the central server computer 106 extracts the desired bookmarks requested in the request message 205 from the central bookmark list 204, forms an answer message 206 and transmits the answer message 206 to the mobile device 100.

After having received the bookmark message 206, the mobile device 100 now has access to the requested bookmarks 301 and thus can select a bookmark, i.e. an internet address of the document the user of the mobile device 100 wants to be printed.

In the following, the system architecture and the detailed process for printing the desired document being identified using the bookmark, will be illustrated.

While the user selects the bookmarks, a string of information is packed into an HTTP packet in an illustrative format shown below, thereby forming the first bookmark message 203:

HTTP header
/MapleWML/CMServer/AddBookmarkFile.asp
Username
User Password (for the purpose of security)
Bookmark name
Bookmark address
HTTP Trailer.

The parameter "Bookmark name" includes the name of the respective bookmark. The parameter "Bookmark address" includes the selected network path bookmark information and identifies and is associated with the actual location of the individual document. By selecting such a bookmark (to be discussed later), the central server computer 106 is able to identify the document to be printed.

Such an HTTP packet then will be sent to the central server computer 106 via the internet 108 as the first bookmark message 203.

In this embodiment, upon receiving it, the central server computer 106 is activated by the parameter "/MapleWML/ CMServer/AddBookmarkFile.asp" to run a script. Thus the information following this parameter, i.e., the Username, User password, Bookmark name, Bookmark address, will be added to a bookmark database 204 (not shown) of the central server computer 106. The bookmark database 204 stores the bookmark names 302 as well as the bookmark address 303, i.e. the URL, in other words the location of the document to be printed.

Furthermore, the personal computer 102 needs to be publicly accessible, that is, in a public domain so that by using its Username and User Password, other computers or servers can access and retrieve the respective web pages as documents from it.

Figure 3:
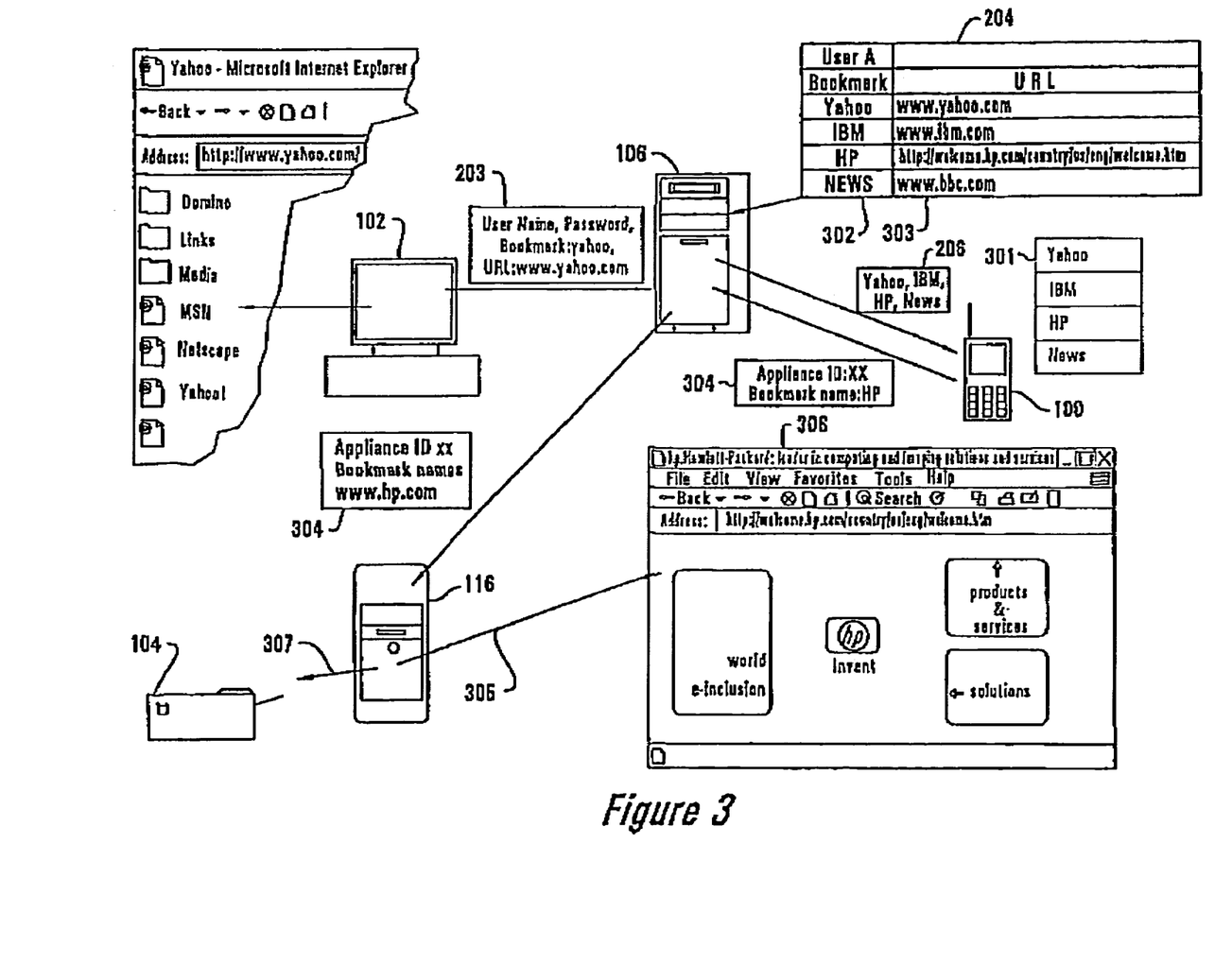
FIG. 3 illustrates the exchange of bookmarks according to the preferred embodiment of the invention in more detail.

Additionally, a plurality of appliances, including, for example, the printer 118, a fax machine 120, and a projector 122, are connected to an appliance server 116 and are registered in the central server computer 106. As a result, the central server computer 106 knows which appliances are login and where they are through the Appliance Identities (IDs) of the individual appliances and appliance server Internet Protocol (IP) address. Similarly, the appliances get registered by the appliance server 116 which is sending the central server computer 106, for example, an HTTP packet in the following illustrative format:

HTTP header
/MapleWML/CMServer/ApplianceLogin.asp
Appliance ID
Password for the Appliance Server
Appliance Server IP Address
HTTP Trailer, where the parameter "/MapleWML/CMServer/Appliance-Login.asp" activates the central server computer 106 to run a script such that the information following this parameter in the packet will be loaded to an appliance database (not shown) of the central server computer 106. The parameter "Appliance ID," for example, the appliance name, identifies the appliance to be registered. The parameter "Appliance Server IP Address" helps the central server computer 106 to locate the appliance server 116, and further to know where the appliances are.

When the user is away from his computer 110 and wants a printed copy of a document being uniquely identified by the URL of the bookmark, the user may use his mobile phone 100 to request the central server computer 106 for the centrally stored bookmarks. The request message 205 reaches the central server computer 106 via a Public Switched Telephone Network (PSTN) 104, a gateway 102 and the internet 108. For communication between the mobile device 100 and the gateway 102, standard telecommunication protocols such as Wireless Application Protocols (WAP) are used. It is understood that WAP is used as a transport layer protocol based on the transport layer GSM. Higher data rate transport layers such as 3G can also be used. In the context of WAP, the mobile phone is WAP-enabled, and the request from the mobile device 100 is in the following illustrative format:

WAP Header
Username
User Password
WAP Trailer.

The gateway 102 converts the request, as well as instructions (as discussed below), to an HTTP format suitable for transfer through the internet 108. Subsequently, the gateway 102 passes the request to the central server computer 106.

It is noted that the mobile device 100 needs to install settings for identifying the gateway 102 and the central server computer 106 in advance. The mobile device 100 will then be able to contact the appropriate central server computer 106 via the appropriate gateway 102. Such a technology is well known in the field of wireless communication.

After receiving the request, the central server computer 106 packs a reply, i.e. the answer message 206 in the following illustrative HTTP format:

HTTP Header
bookmark name
HTTP Trailer, where the bookmark name includes the name of the bookmark which is assigned to the bookmark address 302, i.e. the actual URL, of all the documents which are freely accessible for the respective user of the mobile device 100. The central server computer 106 further sends its reply through the established connection towards the gateway 102, which in turn would convert the reply into a WAP format for displaying on the mobile device 100.

The user selects a document to be printed by selecting a bookmark (the bookmark name and/or the bookmark address) pointing to the desired document and a printer to which the document is to be printed via the mobile device 100. Such a selection is incorporated into an instruction, a printing instruction in the case of this embodiment, by the mobile device 100 according to the following illustrative format:

WAP Header
Username
User Password
Bookmark name
Appliance ID
WAP Trailer.

The parameter "Bookmark name" identifies the name of the bookmark which is assigned to the parameter "Bookmark address" in the central server computer, which parameter identifies the location of the document to be printed by the URL pointing to the internet page as the document, while the parameter "Appliance ID" identifies the appliance to which the document is to be applied. In the case of printing a document, the "Appliance ID" will be the printer name of a selected printer.

The mobile device 100 then sends the printing instruction message 304 to the central server computer 106 via the PSTN 104, gateway 102, and the internet 108. After receiving such an instruction message 304 in the central server computer 106, the content of the instruction message 304 is stored in the central server computer 106.

Using the parameter "Bookmark name" in the instruction message 304, the central server computer 106 determines the corresponding bookmark address according to the stored central bookmark list 204.

In a predetermined periodic time interval, the appliance server 116 polls stored instruction messages 304 and the determined bookmark addresses from the central server computer 106.

After having downloaded the at least one instruction message 304 and the determined bookmark addresses, the appliance server 116 starts a browser program 201, preferably an internet browser program (World Wide Web browser program, WWW browser program), e.g. the Netscape™

Communicator™ browser program or the Internet Explorer™, which is installed in the appliance server 116.

Using the respective bookmark address, i.e. the URL of the bookmark name in the respective instruction message 304, the appliance server 116 connects to the respective internet site 306 (reference number 305 in FIG. 3) being addressed by the URL and downloads the addressed HTML page 306.

When the web page 306 had been downloaded by the appliance server 116, the appliance server 116 converts the web page 306 into the respective format of the appliance which is denoted by the ApplianceID, in other words into the desired output format of the output appliance.

The appliances such as the printer 118, a fax machine 120, and a projector 122 are connected to the appliance server 116. The appliance server 116 has been installed with all the necessary applications and drivers of those connected appliances, in particular, printer drivers of the connected printers.

The appliance server 116 thus converts the document to a format suitable for the designated appliance. In the present embodiment, the document is converted to a print job in a Page Descriptive Language (PDL) format. According to the printing instruction, the print job 307 is passed to the designated printer 118 identified by the ApplianceID, e.g., the printer name. A hard copy of the document will be then generated.

Alternatively, the user can apply the document to other appliances such as the fax machine 120 or the projector 122. The user needs to designate the appliance in the instructions being sent to the central server computer 106 by incorporating the appliance identity into the instructions. Accordingly, the appliance server 116 converts the retrieved document to a format suitable for the designated appliance and further passes it to the appliance.

Further alternatives can be made to the above-described embodiments. For example, the appliances can also be connected to the central server computer 106 directly, in which case the central server computer 106 also acts as an appliance server 116.

According to the embodiment of the invention, the user of the mobile device 100 can now apply information downloaded from internet to an appliance using the bookmarks.

Additionally, other mobile devices such as personal digital assistants can be used on condition that they are able to communicate with the gateway 102.

In the following, some general aspects of the invention and further alternative embodiments are illustrated.

In an alternative embodiment of the invention, a plurality of appliances is registered in the first computer system. The plurality of appliances can be connected to the first computer system via a second communication network. The mobile device designates a first appliance from the plurality of appliances by specifying it in the instructions.

Furthermore, the first network includes a gateway with which the mobile device communicates by using standard telecommunication protocols. The gateway converts the instructions to a format which the first computer system understands. Preferably, the instructions are converted to a format suitable for transfer through the internet, e.g. the HTML format or the WML format.

The first appliance can be a printer, a fax machine, or a projector. In one embodiment, the first appliance is a printer and the first computer system converts the information to a print job in a format suitable for printing.

According to another aspect of the invention, a computer system has an interface for receiving instructions from the mobile device via a first communication network. The instructions designate information to be processed and the appliance to which the designated information is to be applied. The appliance is connected to the computer system. The computer system has a sub-system for processing the instructions and retrieving the designated information. The sub-system further applies the information to the appliance.

The mobile device may designate the information by incorporating the location thereof into the instructions such that the computer system is capable of retrieving the information.

In this embodiment, the sub-system may convert the information to a format suitable for the appliance.

In this context, it should be mentioned that the invention also may be implemented in a scenario without any firewalls or gateways, especially in a scenario of a local area network the mobile device is connected to.

Furthermore, it should be mentioned, that usually, the bookmarks is not used for internet surfing, but usually for printing purposes. The reason for this is mainly that usually a document being encoded according to the HTML may not be viewed on a WAP (Wireless Application Protocol) mobile device 100.

According to an alternative embodiment of the invention, network path bookmark information being encoded according to the WML standard (Wireless Markup Language) is provided for synchronization. In this context, the bookmark information may also be used for surfing purposes.

According to a further embodiment of the invention, the mobile device transmits a request for a network path bookmark information to the server computer. The server computer then determines whether the requested network path bookmark information is already stored in the server computer. In case that the requested network path bookmark information is not stored in the server computer, the server computer transmits a request for the network path bookmark information to the client computer, and the client computer transmits the requested network path bookmark information to the server computer. In case that the network path bookmark information is stored in the server computer, the server computer transmits the requested network path bookmark information to the mobile device.

According to a further alternative embodiment of the invention, the user sends an email to the server or fills in an electric form before he leaves his personal computer. In this case, it is even not necessary to have a web browser application being installed in the client computer, i.e. the user's personal computer. The central server computer may be updated manually with the correct URLs.

According to this alternative embodiment of the invention, a user can update the central server computer with any bookmark which he might access and printing a document being addressed by a bookmark by performing the following steps, for example:

1. The user updates the central server computer using an email or using web pages.
2. The user of the mobile device selects a bookmark name and transmits the bookmark name to the central server computer using the mobile device.
3. The central server computer surfs, i.e. connects to the web page being addressed by the bookmark address corresponding to the selected bookmark name, and gets the respective web page rendered.
4. In a last step, the central server computer transmits the rendered web page to a printer, generally the selected appliance, which is connected to the central server computer.

What is claimed is:

1. A method for providing access to network path bookmark information for a mobile device, the network path bookmark information being stored in a client computer, said method comprising:
repeatedly receiving, at a server computer in a predetermined time interval via a first communication network, the network path bookmark information from a client computer, wherein the network path bookmark information is stored in a browser application installed in the client computer and comprises a user-selected bookmark address for quick retrieval;
receiving, at a server computer via a second communication network, a request for a bookmark name corresponding to the user-selected bookmark address from a mobile device;
transmitting, from the server computer, the bookmark name to the mobile device, the bookmark name allowing the mobile device access to information available at the user-selected bookmark address contained in the network path bookmark information;
receiving, at the server computer via the second communication network, an instruction from the mobile device to service the information with an appliance, the instruction includes the bookmark name and an appliance identification (ID) of the appliance;
transmitting, from the server computer, at least the user-selected bookmark address corresponding to the bookmark name and the appliance ID to an appliance server;
the appliance server retrieving the information with the user-selected bookmark address transmitted by the server computer and providing the retrieved information to the appliance based on the appliance ID to allow the appliance to service the information in accordance with the instruction from their mobile device.

2. The method of claim 1, wherein the network path bookmark information is stored in a predetermined directory in the client computer.

3. The method of claim 1, wherein the browser application is an internet browser application program.

4. The method of claim 1, further comprising:
transmitting from the server computer a request for access to the network path bookmark information to the client computer upon receiving at the server the request from the mobile device.

5. The method of claim 1, wherein the network path bookmark information is encoded according to the HTML format or according to the WML format.

6. The method of claim 1, wherein the user-select bookmark address designates a remotely stored information to be processed, the method further comprising:
designating the bookmark name and the appliance to which the remotely stored information is to be applied as instructions in the mobile device;
transmitting the instructions from the mobile device to a first computer system via a third communication network,
the first computer system retrieving the remotely stored information based on the instructions and converting The information to a format suitable for the appliance; and
the first computer system supplying the remotely stored information to the appliance for processing according to the instructions.

7. The method of claim 6, wherein the first computer system is an appliance server computer.

8. The method of claim 6,
wherein a plurality of appliances are connected to the first computer system, and the appliance is among said plurality of appliances in the instructions.

9. The method of claim 8, wherein said plurality of appliances are registered in the first computer system.

10. The method of claim 8, wherein the appliance is designated based on the client computer's identity in the instructions.

11. The method of claim 8, wherein the third communication network includes a gateway using standard telecommunication protocols, and the gateway converts the instructions to a format which the first computer system understands.

12. The method of claim 8, wherein the remotely located information is stored in a second computer system from which the first computer system retrieves the remotely located information according to the instructions.

13. The method of claim 8, wherein the appliance is a printer, and the first computer system converts the remotely located information to a print job in a format suitable for printing.

14. The method of claim 8, wherein the first computer system converts the remotely located information to a PDL format for printing.

15. The method of claim 1, wherein:
the appliance is one of a printer, a fax machine, and a display device; and
the instruction to service the information with the appliance is one of printing the information with the printer, faxing the information with the fax machine, and displaying the information with the display device.

16. A method for providing access to network path bookmark information for a mobile device, comprising:
receiving a request from the mobile device for access to the network path bookmark information, wherein the network path bookmark information is stored in a browser application installed in a client computer and comprises a user-select bookmark address for quick retrieval;
determining whether the requested network path bookmark information is already stored in the server computer;
upon determining that the requested network path bookmark information is not already stored, transmitting a request for the network path bookmark information to the client computer;
receiving the requested network path bookmark information from the client computer;
once the requested network path bookmark information is received, transmitting the requested network path bookmark information to the mobile device in response to the request from the mobile device;
receiving an instruction from the mobile device to service information available at the user-select bookmark address with an appliance, the instruction includes a bookmark name corresponding to the user-select bookmark address and an appliance identification (ID) of the appliance;
transmitting at least the user-selected bookmark address corresponding to the bookmark name and the appliance ID to an appliance server, wherein the appliance server is in communication with the appliance to provide the information available at the user-selected bookmark address to the appliance based on the appliance ID to allow the appliance to service the information in accordance with the instruction from the mobile device.

17. The method of claim 16, wherein:

the appliance is one of a printer, a fax machine, and a display device; and the instruction to service the information with the appliance is one of printing the information with the printer, faxing the information with the fax machine, and displaying the information with the display device.

18. A computer system which allows a user of a mobile device to access network path bookmark information, the computer system comprising:

a client computer having stored network path bookmark information comprising at least one user-selected bookmark address being stored in a predetermined directory in the client computer for quick retrieval in a browser application, and comprising means for determining the network path bookmark information from the predetermined directory repeatably in a predefined time interval;

a server computer connected to the client computer via a first communication network, the server computer operates to receive the determined network path bookmark information from the client computer;

a mobile device connected to the server computer via a second communication network and operates to request a bookmark name corresponding to the bookmark address from the server computer and to provide an instruction to the server computer to service information available at the user-selected bookmark address with an appliance, wherein the instruction includes the bookmark name and an appliance identification (ID) of the appliance; and an appliance server connected to the server computer via a third communication network and in communication with the appliance, the appliance server operates to receive from the server computer the appliance ID and the user-selected bookmark address corresponding to the bookmark name so as to service the information available at the user-selected bookmark address with the appliance based on the appliance ID.

19. The computer system of claim 18, wherein:

the appliance is one of a printer, a fax machine, and a display device; and the instruction to service the information with the appliance is one of printing the information with the printer, faxing the information with the fax machine, and displaying the information with the display device.

\* \* \* \* \*